(12) United States Patent
Lam

(10) Patent No.: US 9,599,836 B2
(45) Date of Patent: Mar. 21, 2017

(54) COMPACT ELECTROMAGNETIC ACTUATOR

(71) Applicant: Sio Kuan Lam, Hong Kong (HK)

(72) Inventor: Sio Kuan Lam, Hong Kong (HK)

(73) Assignee: SUNMING TECHNOLOGIES (HK) LIMITED, Hong Kong (HK)

( * ) Notice: Subject to any disclaimer, the term of this patent is extended or adjusted under 35 U.S.C. 154(b) by 54 days.

(21) Appl. No.: 14/158,783

(22) Filed: Jan. 18, 2014

(65) Prior Publication Data

US 2015/0077852 A1    Mar. 19, 2015

Related U.S. Application Data

(60) Provisional application No. 61/877,303, filed on Sep. 13, 2013.

(51) Int. Cl.
*G02B 27/64* (2006.01)
*G02B 7/04* (2006.01)
(Continued)

(52) U.S. Cl.
CPC ............. *G02B 27/646* (2013.01); *G02B 7/04* (2013.01); *G02B 7/28* (2013.01); *G03B 3/10* (2013.01); *G03B 5/00* (2013.01); *H04N 5/2253* (2013.01); *H04N 5/2254* (2013.01); *H04N 5/2257* (2013.01); *H04N 5/23287* (2013.01); *G03B 2205/0015* (2013.01); *G03B 2205/0069* (2013.01); *H01F 7/0289* (2013.01); *H01F 7/066* (2013.01)

(58) Field of Classification Search
CPC .... G03B 2205/0007; G03B 2205/0015; G03B 2205/0053; G03B 2205/0069; G03B 5/00; G03B 5/02; G03B 5/04; G03B 3/10; G02B 7/04; G02B 7/28; G02B 7/09; G02B 7/282; H04N 5/2253; H04N 5/2254; H04N 5/2257; H04N 5/23264; H04N 5/2328; H04N 5/23287; H01F 7/0289; H01F 7/066
USPC ........................ 359/819–830, 694–706, 557; 310/154.01–155
See application file for complete search history.

(56) References Cited

U.S. PATENT DOCUMENTS 7,725,014 B2    5/2010    Lam et al.
7,881,598 B1    2/2011    Wu et al.
(Continued)

FOREIGN PATENT DOCUMENTS

JP        2012103376 A        5/2012

OTHER PUBLICATIONS

Search Report of counterpart European Patent Application No. 14184432.4 issued on Aug. 6, 2015.

*Primary Examiner* — Thomas K Pham
*Assistant Examiner* — Marin Pichler

(57) ABSTRACT

A compact electromagnetic actuator for driving a lens includes a lens holder used to hold a lens or a lens assembly which defines an optical axis, an image stabilization (IS) actuator provided at one end of the lens holder for producing a linear motion in a plane perpendicular to the optical axis, and an autofocus (AF) actuator provided at an opposite end of the lens holder for producing a linear motion along the optical axis. An AF connection mechanism can be used to connect the autofocus actuator to the lens holder. An IS connection mechanism can be used to connect the image stabilization actuator to the lens holder.

17 Claims, 8 Drawing Sheets

(51) Int. Cl.
   *G03B 3/10*   (2006.01)
   *G03B 5/00*   (2006.01)
   *H04N 5/225*  (2006.01)
   *H04N 5/232*  (2006.01)
   *G02B 7/28*   (2006.01)
   *H01F 7/02*   (2006.01)
   *H01F 7/06*   (2006.01)

(56) References Cited

U.S. PATENT DOCUMENTS

2006/0061660 A1    3/2006   Brackmann
2007/0103555 A1    5/2007   Eromaki
2007/0236577 A1   10/2007   Ke et al.
2010/0098394 A1    4/2010   Ishihara et al.
2013/0016428 A1    1/2013   Sugawara et al.
2013/0258475 A1* 10/2013   Lee ............................... 359/554

\* cited by examiner

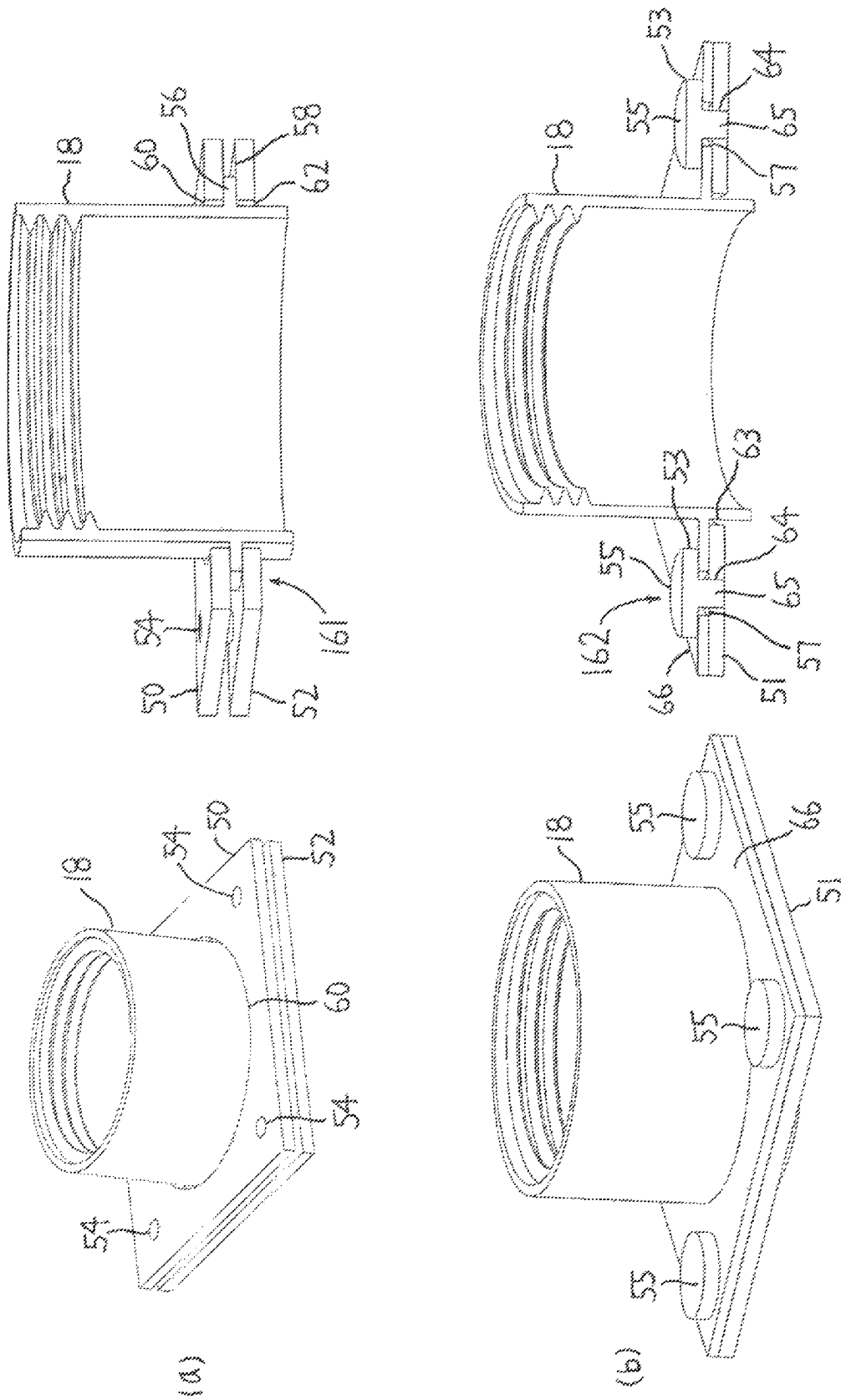

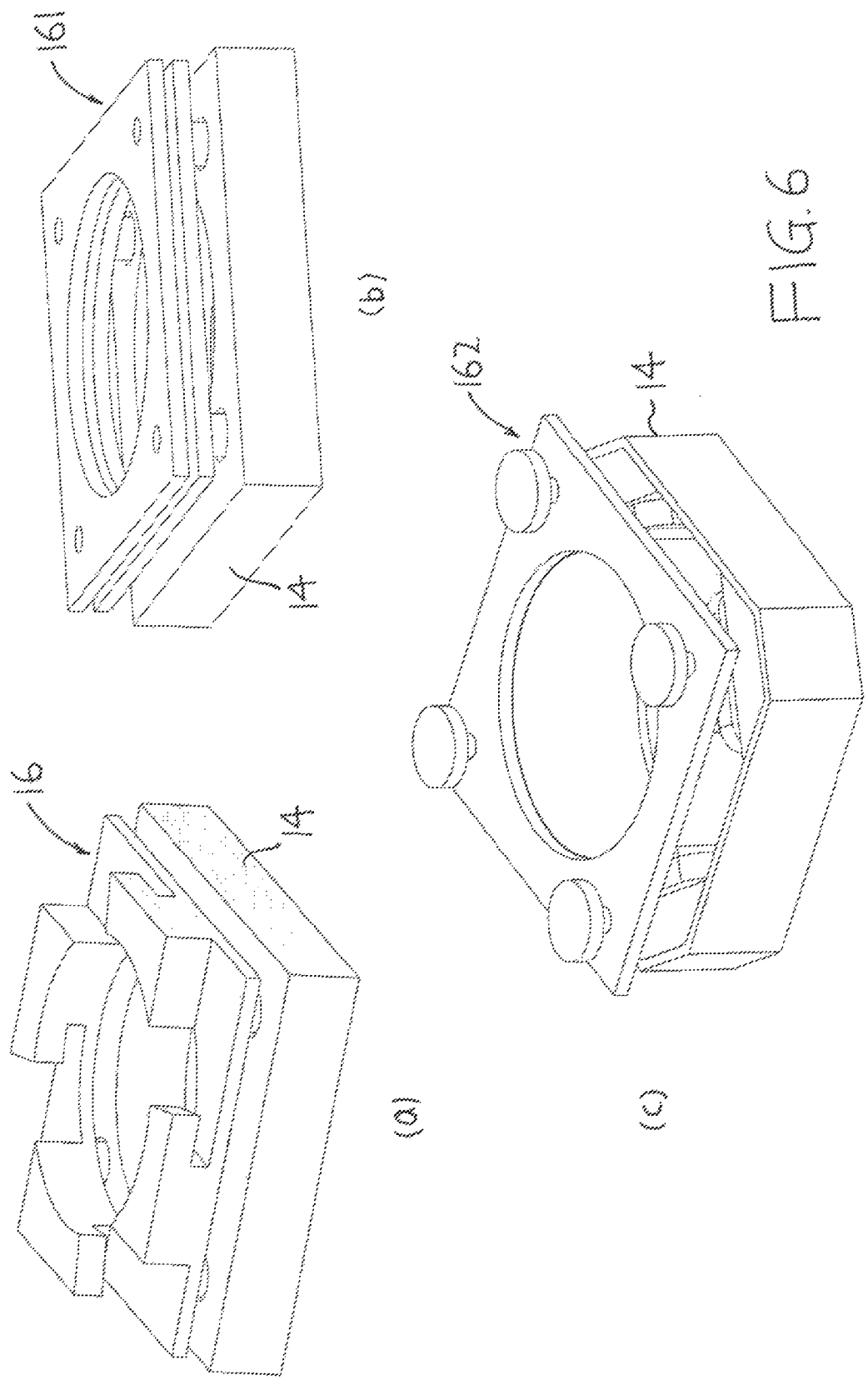

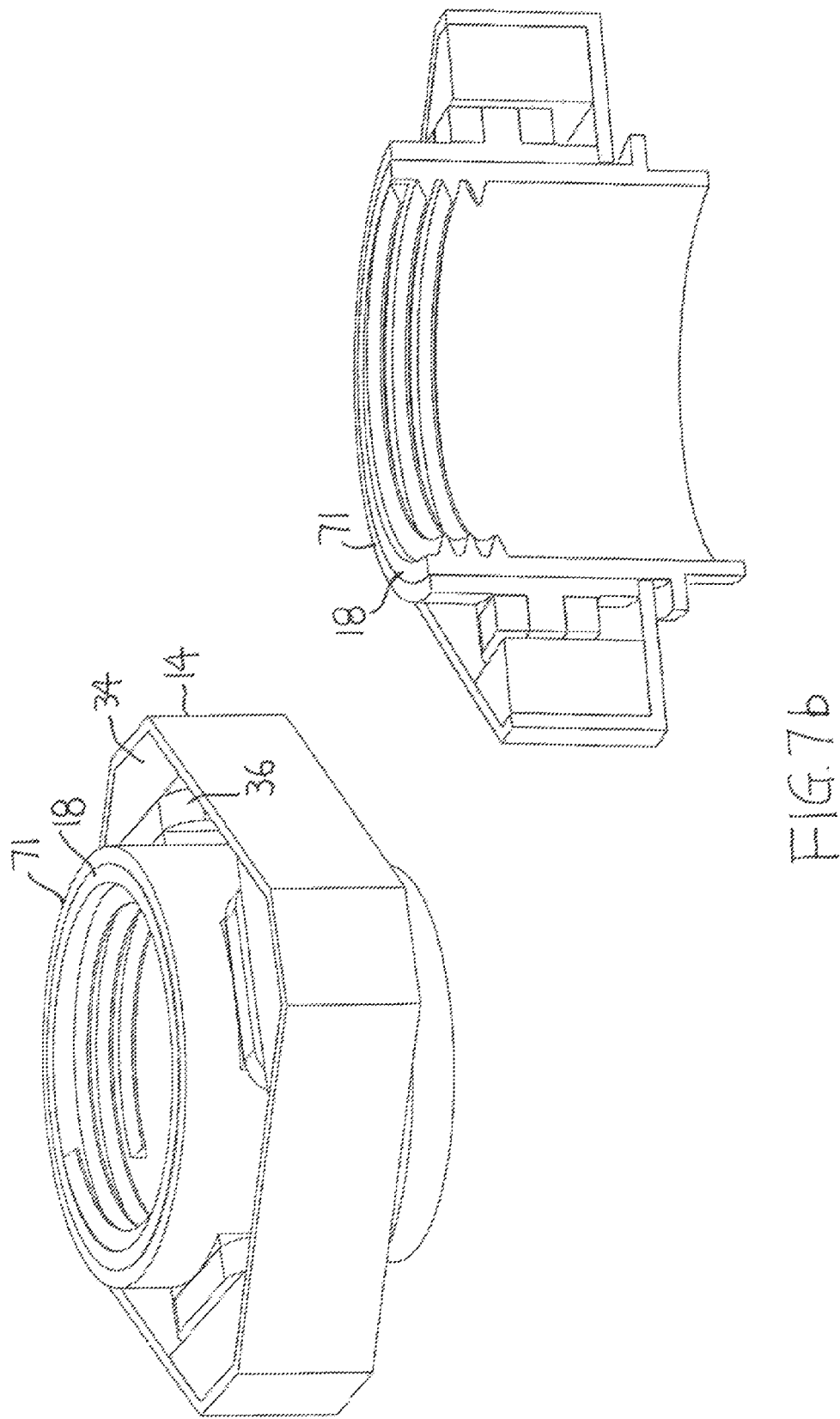

COMPACT ELECTROMAGNETIC ACTUATOR

CROSS-REFERENCE TO RELATED APPLICATIONS

This application claims the benefit of U.S. Provisional Patent Application No. 61/877,303, filed Sep. 13, 2013, the entire content of which is hereby incorporated by reference.

BACKGROUND

The present application relates to a compact electromagnetic actuator capable of driving a lens assembly along X, Y, and Z axis.

With the continuous development of the mobile phone into a convergence device, more and more camera functions have been integrated into a mobile phone. Today, the voice coil motor (VCM) based autofocus camera function has been a standard feature of a high-end camera phone or a smart phone. Besides the autofocus (AF) function, the optical image stabilization (OIS) function is getting market interest and will soon become the next important camera feature to be integrated into the mobile phone. Various inventions about OIS have been disclosed, such as the ones in US patent applications of US2006/0061660, US2007/0103555, US2010/0098394, US2007/0236577, and US2013/0016428, and US patent of U.S. Pat. Nos. 7,881,598 and 7,725,014. Among all the disclosed inventions, three main types of technologies are mostly employed: (1) the body tilting method; (2) the body shifting method; and (3) the lens barrel tilting method.

Body Tilting Method (BTM)

Compared with the body shifting method (BSM), the BTM is based on tilting the AF camera module as a whole with respect to the optical axis to compensate for shaking or vibration. The key feature of this method is that a complete AF camera module is mounted on an image stabilization module or platform, wherein the AF camera module is installed with an imaging sensor, an imaging lens, and a lens actuator, and wherein the image stabilization module or platform is used to drive the complete AF camera module to tilt with respect to the optical axis. US2010/0098394 has disclosed an implementation based on the BTM. The problem of the BTM is its bulky size and its relatively higher power consumption than the BSM method as it drives the whole AF camera module. Obviously, the BTM method needs a large space for implementing the image stabilization module or platform.

Body Shifting Method (BSM)

This method is based on shifting/moving/swinging/displacing the autofocus actuator as a whole along the X and the Y directions. Therefore, a common feature of this method is that a complete AF actuator is mounted on an image stabilization module or platform, wherein the AF actuator is used to drive the lens holder (and hence the imaging lens assembly inside the holder) moving along the optical axis, and wherein the image stabilization module or platform is used to drive the complete AF actuator moving along the X and the Y directions in an XY plane perpendicular to the optical axis of the AF actuator. U.S. Pat. No. 7,881,598 and US2013/0016428 have respectively disclosed two electromagnetic actuators based on the BSM. Regardless of the details of the structure, a complete AF actuator is defined herein as a device which is configured to move a lens holder or an imaging lens assembly along an optical axis. Regardless of various terminologies used in all kinds of articles, patents, and patent applications, devices which satisfy the definition of AF actuator stated herein shall be considered as AF actuators as defined herein.

In the art, the BSM is also called as lens barrel shifting. Actually, it is not a real lens barrel shifting method as the lens barrel is not directly driven by the image stabilization module or platform. Lens barrel shifting is a result of the shifting of the AF actuator as a whole. The drawbacks of this method are its bulky size, large power consumption, slow response time, and etc. Having a bulky size is the most important problem among all the others. Because this method is based on shifting a complete AF actuator, the whole space needed must be larger than an AF actuator's size. This is a very natural and logical result. However, the current market situation is that customers' expectation on the size of the OIS actuator is exactly the same as the size of the AF actuator. Therefore, an actuator based on this method is hardly small enough or identical in size with the AF actuator. However, its advantage is that the image quality does not deteriorate with the shifting of the lens holder. At least, the image quality deterioration is not prominent.

Lens Barrel Tilting (LBT) Method

Compared with the BSM, the LBT method is based on tilting the lens barrel so that the lens assembly is tilted inside the lens holder to compensate for shaking or vibration. U.S. Pat. No. 7,725,014 has disclosed an actuator based on the LBT. The merit of the LBT method is that the image stabilization actuator directly drives the lens holder instead of driving the AF actuator. Since a lens holder is much lighter than a complete AF actuator, the OIS actuator based on the LBT method consumes less power than an OIS actuator based on the BSM. Moreover, due to the light weight of the lens holder, the response time of the LBT OIS actuator is also shorter than that of the BSM OIS actuator. Most importantly, the LBT OIS actuator can achieve the same size of the AF actuator as the AF function and the OIS function of the LBT actuator can be performed by the same set of actuators. Therefore, no extra space is needed. Furthermore, since both the AF and the OIS share the same set of actuators, not much extra material is needed for building the OIS actuator. It implies that such an OIS actuator is likely to have a low cost, at least comparable to the AF actuator's cost.

However, the problem of the LBT method is that the image quality deteriorates quickly as the tilting angle of the lens assembly increases. This significantly limits its applications. However, such problem does not occur to a BSM OIS actuator, or at least this problem is not prominent for the BSM OIS actuator.

In view of the above, there is a need to produce an electromagnetic actuator which is compact and low in power consumption and cost.

The above description of the background is provided to aid in understanding the compact electromagnetic actuator, but is not admitted to describe or constitute pertinent prior art to the compact electromagnetic actuator, or consider the cited documents as material to the patentability of the claims of the present application.

SUMMARY

According to one aspect, there is provided a compact electromagnetic actuator for driving a lens. The actuator includes a lens holder used to hold a lens or a lens assembly which defines an optical axis, an image stabilization (IS) actuator provided at one end of the lens holder for producing a linear motion in a plane perpendicular to the optical axis, and an autofocus (AF) actuator provided at an opposite end of the lens holder for producing a linear motion along the optical axis.

In one embodiment, the image stabilization actuator can be connected to the lens holder via an IS connection mechanism, wherein the lens holder is engaged and movable with the IS connection mechanism in a plane perpendicular to the optical axis while movable, shiftable, or slidable along the optical axis.

In one embodiment, the IS connection mechanism can be provided with surfaces slidably abutting against and around an outer surface of the lens holder, thereby transferring the motion of the image stabilization actuator to the lens holder, and allowing sliding movement of the lens holder along the optical axis.

In one embodiment, the IS connection mechanism can be provided with a circular hollow portion on the center of a planar motion output port of the image stabilization actuator, wherein the circular hollow portion has a surface slidably abutting against and around an outer surface of the lens holder, thereby transferring the motion of the image stabilization actuator to the lens holder, and allowing sliding movement of the lens holder along the optical axis.

In one embodiment, the motion output port can be a bar-type motion output port in the form of a plate having a circular opening formed with circumferentially spaced apart and radially inwardly extending bars for slidably abutting against and around the outer surface of the lens holder.

In one embodiment, the motion output port can be a tubular motion output port in the form of a tube having an inner surface for slidably abutting against and around the outer surface of the lens holder.

In one embodiment, the actuator may further include an AF connection mechanism used to connect the autofocus actuator to the lens holder, wherein the lens holder is engaged and movable with the AF connection mechanism along the optical axis while movable, shiftable, or slidable along a plane perpendicular to the optical axis.

In one embodiment, the AF connection mechanism can be provided on one side thereof a mating portion formed with two opposite surfaces slidably abutting against two corresponding opposite surfaces formed on another mating portion provided on the lens holder, thereby transferring the linear motion of the autofocus actuator to the lens holder along the optical axis, and allowing sliding movement of the lens holder on the opposite surfaces in a plane perpendicular to the optical axis.

In one embodiment, the AF connection mechanism may include a base plate having a circular opening and a plurality of rectangular slots defined by a plurality of L-shaped projections formed on the base plate around the circular opening. The plurality of rectangular slots can be configured to receive therein respectively a plurality of rectangular projections formed around the outer surface of the lens holder. The diameter of the circular opening can be slightly larger than the outer diameter of the lens holder, thereby allowing sliding movement of the rectangular projections within the rectangular slots in a plane perpendicular to the optical axis.

In one embodiment, the AF connection mechanism may include two parallel and spaced part plates and two aligned circular openings formed respectively thereon and defining therebetween an annular slot configured to receive therein an annular projection formed around the outer surface of the lens holder. The diameter of the two circular openings can be slightly larger than the outer diameter of the lens holder, thereby allowing sliding movement of the annular projection of the lens holder within the annular slot in a plane perpendicular to the optical axis.

In one embodiment, the AF connection mechanism may include a base plate having a circular opening and a plurality of headed screws being formed with threaded shank portions inserted through a plurality of openings formed on an annular plate provided on the outer surface of the lens holder, and threaded into a plurality of threaded bores formed on the base plate such that the annular plate is disposed between heads of the headed screws and the base plate. The diameter of the circular opening can be slightly larger than the outer diameter of the lens holder, and the diameter of the plurality of openings on the annular plate can be slightly larger than the diameter of the threaded shank portions of the headed screws, thereby allowing sliding movement of the annular plate on the base plate in a plane perpendicular to the optical axis.

In one embodiment, the autofocus actuator may include an autofocus motion output port for outputting the linear motion of the autofocus actuator to the lens holder. The autofocus motion output port can be a rod-type motion output port, a cylindrical motion output port, a planar motion output port, or an octagonal motion output port.

The compact electromagnetic actuator may further include a plurality of coil-magnet actuators mounted inside the image stabilization actuator and the autofocus actuator. A spring may be provided to replace one of the coil-magnet actuators.

The compact electromagnetic actuator of the present application can be incorporated into any image-capturing electronic devices such as cameras, video recorders, and mobile phones, etc.

The basic concept of the present actuator is that both the autofocus (AF) actuator and the image stabilization (IS) actuator are all directly applied to the lens holder in order to drive the lens holder to shift along the X, Y, and Z directions. According to an embodiment of the present application, an electromagnetic actuator comprises an AF actuator, an image stabilization (IS) actuator, a lens holder, at least a connection mechanism for connecting the lens holder to the AF actuator, and at least a connection mechanism for connecting the lens holder to the IS actuator, wherein the AF actuator produces linear motion along the optical axis (Z axis), wherein the IS actuator produces a linear motion in an XY plane perpendicular to the optical axis, wherein the connection mechanism for connecting the lens holder to the AF actuator provides rigid connection along the optical axis direction and transfers the AF linear motion to the lens holder, wherein the connection mechanism for connecting the lens holder to the AF actuator allows linear motion/translational motion/shifting/sliding motion/displacement along the X and the Y directions, wherein the connection mechanism for connecting the lens holder to the IS actuator provides rigid contact between the lens holder and the IS actuator, and transfers the IS linear motion in the XY plane to the lens holder, wherein the connection mechanism for connecting the lens holder to the IS actuator allows linear motion/translational motion/shifting/sliding motion/displacement along the optical axis (Z axis). The connection mechanism for connecting the AF actuator to the lens holder is defined as an AF connection mechanism. The connection mechanism for connecting the IS actuator to the lens holder is defined as an IS connection mechanism. The AF connection mechanism is configured to have a rigid contact along the optical axis such that the AF actuator can smoothly and firmly drive the lens holder back and forth along the optical axis. On the other hand, the AF connection mechanism is configured to be open along the X and the Y directions such that the lens holder can slide along any direction in the XY plane. The IS connection mechanism is configured to allow the lens holder to move/slide along the optical axis while providing rigid contact between the lens holder and the IS actuator in the XY plane.

BRIEF DESCRIPTION OF THE DRAWINGS

Specific embodiments of the compact electromagnetic actuator will now be described by way of example with reference to the accompanying drawings wherein:

FIG. 5(a) shows a perspective view and a sectional view of the lens holder and the connection mechanism according to another embodiment of the present application;

FIG. 5(b) shows a perspective view and a sectional view of the lens holder and the connection mechanism according to a further embodiment of the present application;

FIG. 6(a) shows an integration of an autofocus actuator with the connection mechanism of FIG. 4;

FIG. 6(b) shows an integration of the autofocus actuator with the connection mechanism of FIG. 5(a);

FIG. 6(c) shows an integration of another autofocus actuator with the connection mechanism of FIG. 5(b);

FIG. 7(b) is a perspective view of an image stabilization actuator connected to a lens holder according to another embodiment of the present application.

DETAILED DESCRIPTION

Figure 1:
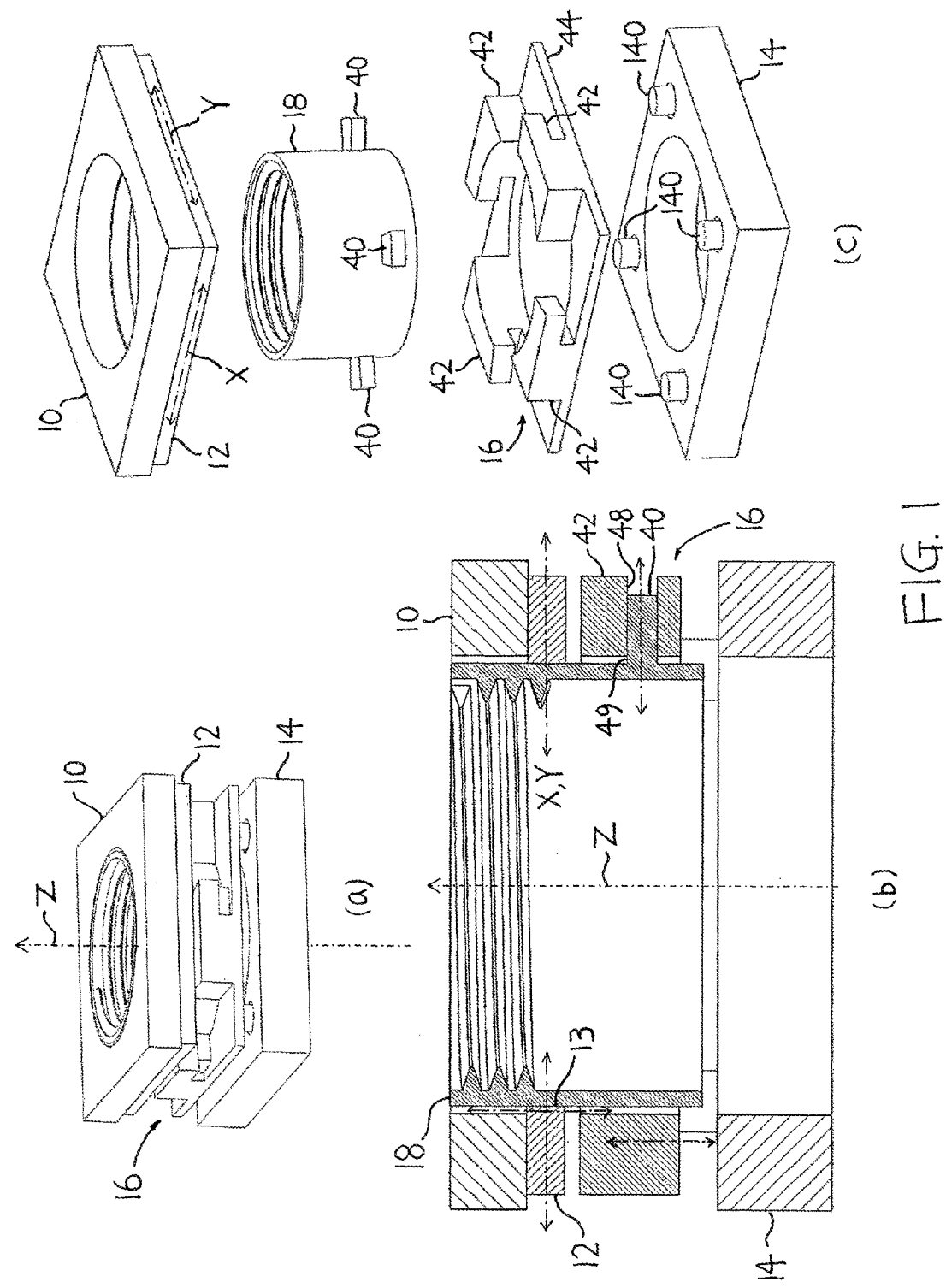
FIG. 1(a) is a perspective view of a compact electromagnetic actuator in accordance with an embodiment of the present application.
FIG. 1(b) is a sectional view of the compact electromagnetic actuator in FIG. 1(a)
FIG. 1(c) is an exploded view of the compact electromagnetic actuator in FIG. 1(a)

In the following detailed description, numerous specific details are set forth to provide a thorough understanding of claimed subject matter. However, it will be understood by those skilled in the art that claimed subject matter may be practiced without these specific. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particularly embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Likewise, the terms, "and", "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures, or characteristics. Though, it should be noted that this is merely an illustrative example and claimed subject matter is not limited to this example.

As used to describe such embodiments, terms "above", "below", "upper", "lower", and "side" describe positions relative to an optical axis of such a compact imaging module. In particular, "above" and "below" refer to positions along an optical axis, wherein "above" refers to one side of an element and "below" refers to an opposite side of the element. Relative to such an "above" and "below", "side" refers to a side of an element that is displaced from an optical axis, such as the periphery of a lens, for example. Further, it is understood that such terms do not necessarily refer to a direction defined by gravity or any other particular orientation. Instead, such terms are merely used to identify one portion versus another portion. Accordingly, "upper" and "lower" may be equivalently interchanged with "top" and "bottom", "first" and "second", "right" and "left", and so on.

It should be noted that throughout the specification and claims herein, when one element is said to be "connected" to or with another, this does not necessarily mean that one element is fastened, secured, or otherwise attached to another element. Instead, the term "connected" means that one element is either connected directly or indirectly to another element or is in mechanical or electrical communication with another element.

It should be understood that the protection is not limited to the preferred embodiments described hereinabove and, needless to say, a variety of modifications or variations may be made without departing from the scope of the protection defined herein.

FIGS. 1(a)-1(c) show different views of a compact electromagnetic actuator in accordance with an embodiment of the present application. The compact electromagnetic actuator includes an image stabilization (IS) actuator 10, an autofocus (AF) actuator 14, a lens holder 18 used to hold a lens or lens assembly, an autofocus (AF) connection mechanism 16 connecting the lens holder 18 to the AF actuator 14, and an image stabilization (IS) connection mechanism 12 connecting the lens holder 18 to the IS actuator 10. Regardless of the details of the internal structure, the AF actuator 14 in FIG. 1 is represented by a rectangular block with a hollow portion at the center of the block. This hollow portion is used to accept the lens holder 18 or a lens assembly to travel/move/shift/insert into it. Four rod-type motion output ports 140 may be installed in the AF actuator 14. These motion output ports 140 can move linearly up and/or down when the AF actuator 14 is energized. Certainly, it is not necessary to have four output ports in real applications or implementations. One output port is already enough. Drawing four output ports in this figure is purely for the symmetric arrangement of the ports surrounding the hollow portion of the AF actuator 14. Needless to say, using 1, 2, 3 or even more output ports in the implementation does not depart from the scope of the protection. The output ports of AF actuator 10 are connected to the AF connection mechanism 16 to drive the connection mechanism up and down.

In FIG. 1, the AF connection mechanism 16 connects to the lens holder 18 via a mating mechanism 42, which is formed with two opposite surfaces 48 slidably abutting against two corresponding opposite surfaces 49 formed on another mating portion 40 provided on the lens holder 18, thereby transferring the linear motion of the AF actuator 14 to the lens holder 18 via the connection mechanism 16 along the optical axis Z, and allowing sliding movement of the lens holder 18 on the opposite surfaces 48 in an XY plane perpendicular to the optical axis Z. In FIG. 1, four mating portions 42 may be provided on one side of the base plate 44. Needless to say, the four mating portions 42 can be provided on both sides of the base plate 44. Needless to say, using less number of mating portions 42 does not depart from the scope of the protection. The lens holder 18 may be cylindrical in shape and defines therein an optical axis Z. Needless to say, the lens holder 18 can take various shapes as long as it can be used to hold a lens assembly. The lens holder 18 may include a mating portion 40 having two opposite surfaces 49 slidably abutting against two corresponding opposite surfaces 48 formed on another mating portion 42 provided on the AF connection mechanism 16. In FIG. 1, four mating portions 40 are formed on the lens holder 18. Needless to say, using less number of mating portions 40 does not depart from the scope of the protection.

Regardless of the details of internal structure, the IS actuator 10 in FIG. 1 is represented by a rectangular block with a hollow portion at the center of the block. This hollow portion is used to accept the lens holder 18 or the lens assembly to travel/move/shift/insert into it. The IS actuator 10 may include a moving plate 12 which can move along the X and the Y directions when the IS actuator 10 is energized. Any moving direction lying in the XY plane can be obtained by carefully controlling the X- and Y-axis movement. Certainly, it is not necessary to use a full size plate as shown in FIG. 1. In real implementation, a smaller moving plate with different shape can be adopted to reduce the material cost.

The IS actuator 10 can be provided at one end of the lens holder 18 for producing a linear motion in an XY plane perpendicular to the optical axis Z. The AF actuator 14 can be provided at an opposite end of the lens holder 18 for producing a linear motion along the optical axis Z.

Figure 2:
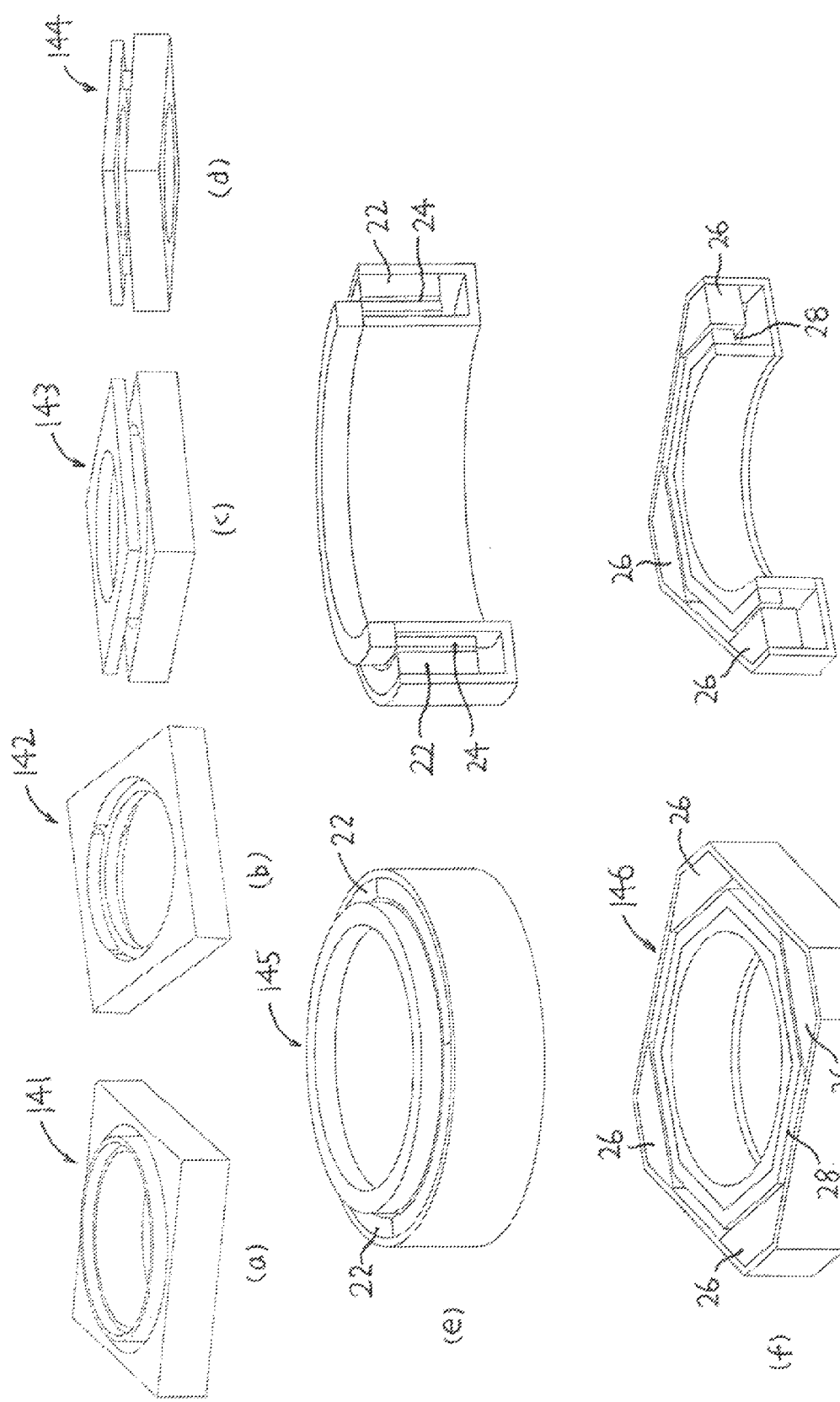
FIGS. 2(a) to 2(f) show different embodiments of an autofocus actuator of the compact electromagnetic actuator.

In the present embodiment shown in FIG. 1, the moving plate 12 of the IS actuator 10 is also used as IS connection mechanism to connect the IS actuator 10 to the lens holder 18. The IS connection mechanism 12 can be a plate having a hollow portion at the center of the plate. The IS connection mechanism 12 may further include a surface or surfaces 13 slidably abutting against and around an outer surface of the lens holder 18, thereby transferring the linear motion of the IS actuator 10 to the lens holder 18, and allowing sliding movement of the lens holder 18 along the optical axis Z. In some embodiments, the IS connection mechanism 12 may take various shape or form. FIGS. 2(*a*) to 2(*f*) show different embodiments of the AF actuator 14 of the compact electromagnetic actuator. The AF actuator 14 includes an AF motion output port for outputting the linear motion from the AF actuator 14 to the lens holder 18. Various type of motion output ports are illustrated by FIG. 2 (*a*) cylindrical motion output port 141, (*b*) planar circular motion output port 142, (*c*) planar motion output port 143, and (*d*) complex motion output port 144. The complex motion output port 144 can take a lot of different forms. In one embodiment, it can be a combination of a rod-type motion output port 140 as depicted in FIG. 1(*c*) and a planar-type output port 143. FIGS. 2(*e*) and 2(*f*) are two further embodiments 145, 146 which show coils 22, 26 and magnets 24, 28 of the AF actuators 14.

The AF actuator 14 can take a more complex structure. In some embodiments, the AF actuator 14 may include one or more guiding mechanisms to precisely control the linear-motion direction. Such AF actuator 14 may further include a Hall sensor to precisely control the lens holder 18 position. In another embodiment, the AF actuator 14 may include a pair of leaf springs to function as the traditional voice coil motor (VCM).

Figure 3:
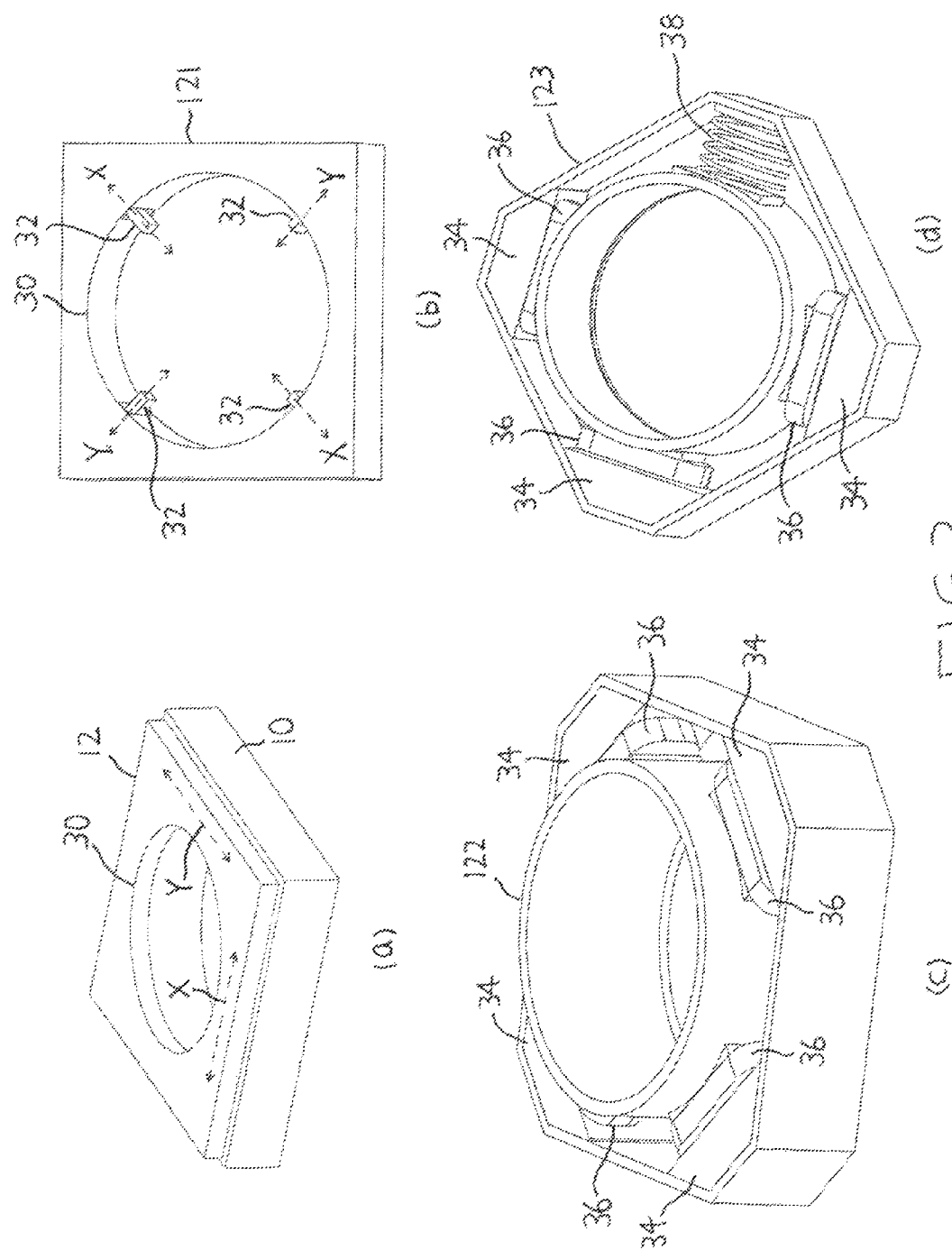
FIGS. 3(a) to 3(d) show different embodiments of an image stabilization actuator of the compact electromagnetic actuator.

FIGS. 3(*a*) to 3(*d*) show different embodiments of the IS actuator 10 of the compact electromagnetic actuator in the present application. The IS actuator 10 may be slidably abutting against and around the outer surface of the lens holder 18 through an IS motion output port. FIG. 3(*a*) depicts a planar motion output port 12 in the form of a single plate having a single circular opening 30 for slidably abutting against and around the outer surface of the lens holder 18. FIG. 3(*b*) depicts a bar-type motion output port 121 in the form of a single plate having a single circular opening 30 formed with circumferentially spaced apart and radially inwardly extending bars 32 with surfaces slidably abutting against and around the outer surface of the lens holder 18. The bars 32 are capable of moving radially inward or outward as shown by the arrows in the FIG. 3(*b*). Precisely controlling the radial motion of these bars 32, the IS actuator 10 can drive the lens holder 18 to move linearly along any direction lying in the XY plane. FIG. 3(*c*) depicts a tubular motion output port 122 in the form of a tube having an inner surface for slidably abutting against and around the outer surface of the lens holder 18.

In FIG. 3(*c*), the tubular motion output port 122 can also be used as the lens holder 18 or part of the lens holder 18 in some embodiments. FIG. 3(*c*) also shows more details on the structure of the IS actuator 10 according to one embodiment of the present application. In this embodiment, four coil-magnet actuators, having coils 36 and magnets 34, are installed on corner areas of the actuator. When the coils 36 are energized, the current flowing through the coils 36 will interact with the magnetic field created by the magnet 34. Depending on the direction of the current, the resultant electromagnetic force can be a "push" or a "pull" force. Two coil-magnet actuators aligned in a diagonal can form a push-pull pair, thus doubling the electromagnetic force. The push-pull forces along X and Y directions will drive motion output port 122 to move along any direction lying in the XY plane.

To reduce the material cost, a spring can be used to replace one of the diagonal pair of coil-magnet actuators as shown in FIG. 3(*d*), in which a helical spring 38 may be used to replace one of the coil-magnet actuators 34, 36. In such situation, the resultant electromagnetic force decreases by half. In another embodiment, the helical spring 38 can be replaced by some other type of springs, such as a leaf spring, an elastic wire, an elastic rod or bar, a rubber, an elastic film or material.

Moreover, the IS actuator 10 can take a more complex structure. In one embodiment, an IS actuator may include one or more guiding mechanisms to precisely control the X and the Y directions. Such IS actuator 10 may further include a Hall sensor to precisely control the lens holder 18 position.

In the embodiment shown in FIG. 1, the IS actuator 10 can be located at a top end of the lens holder 18 of the electromagnetic actuator; while the AF actuator 14 can be located at a bottom end of the lens holder 18 of the electromagnetic actuator. The motion output port 12 of the IS actuator 10 may be facing down to the AF actuator 14 and on the bottom of IS actuator 10. However, in another embodiment, the IS actuator 10 can be facing up and the motion output port 12 can be located on the top of the IS actuator 10. Similar arrangement can also be applied to the AF actuator 14. The idea of the present actuator is that the top-bottom, upper-lower, up-down can be interchanged and the resultant devices do not depart from the scope of protection.

Figure 4:
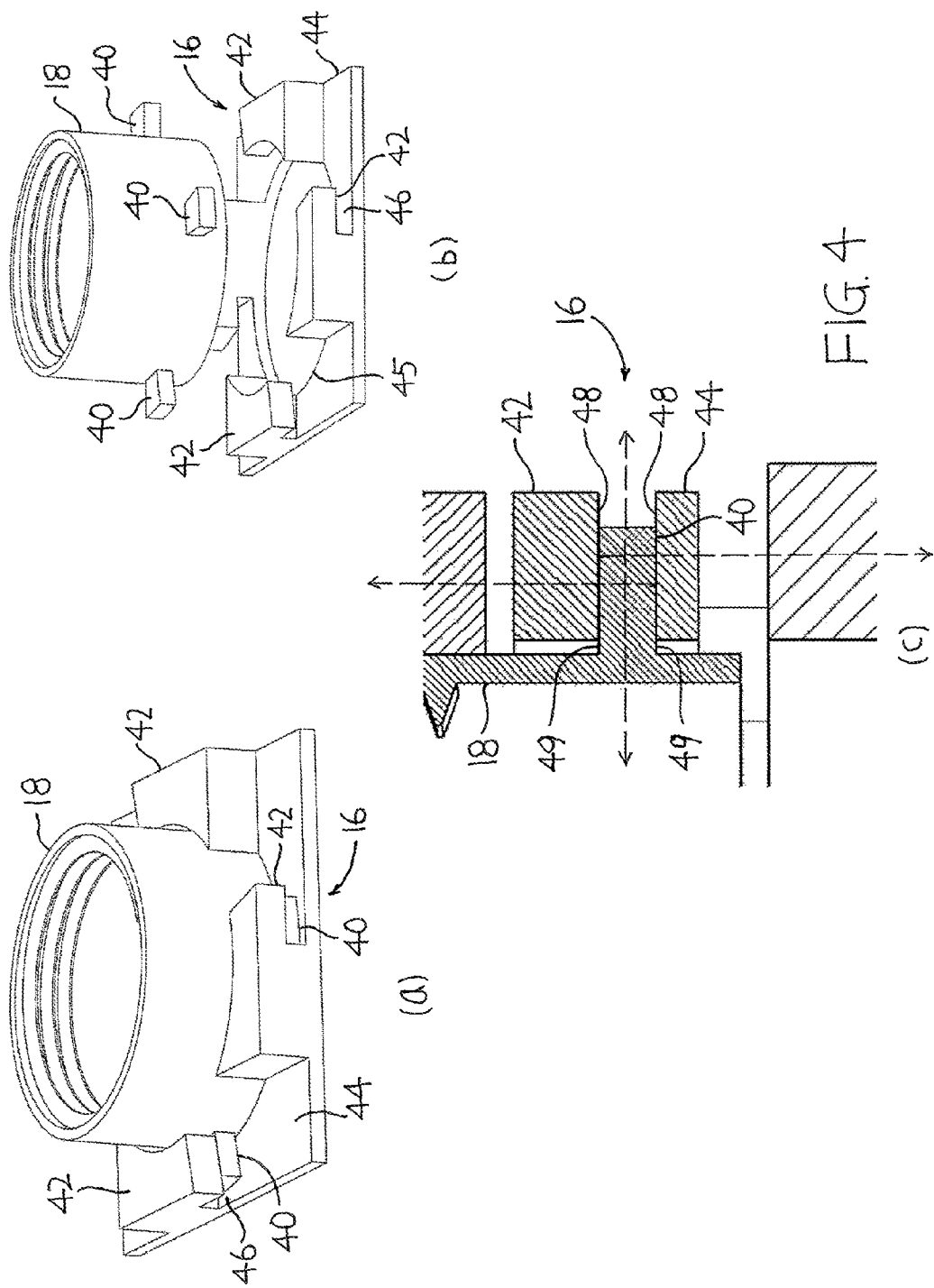
FIG. 4(a) is a perspective view of a lens holder and a connection mechanism according to an embodiment of the present application.
FIG. 4(b) is an exploded view of the lens holder and the connecting member depicted in FIG. 4(a)
FIG. 4(c) is a sectional view showing the mating of the lens holder and the connection mechanism depicted in FIG. 4(a)

FIGS. 4(*a*)-4(*c*) are different views of the lens holder 18 being connected to the AF connection mechanism 16 according to an embodiment of the present application. The AF connection mechanism 16 may include a base plate 44 having a circular opening 45 and a plurality of rectangular slots 46 defined by a plurality of mating portions in the form of L-shaped projections 42 formed on the base plate 44 around the circular opening 45. The plurality of rectangular slots 46 can be configured to receive therein respectively the plurality of mating potions in the form of rectangular projections 40 formed around the outer surface of the lens holder 18. The diameter of the circular opening 45 may be slightly larger than the outer diameter of the lens holder 18, thereby allowing sliding movement of the rectangular projections 40 within the rectangular slots 46 in a plane perpendicular to the optical axis Z.

Although it has been shown and described that the rectangular projections 40 are formed on the lens holder 18 and the rectangular slots 46 are formed on the AF connecting member 16, it is appreciated that the rectangular projections 40 can be formed on the AF connecting member 16 and the rectangular slots 46 can be formed on the lens holder 18 instead.

The base plate 44 can be fixedly connected to the AF actuator 14. The thickness of the rectangular slots 46 may be substantially close to the thickness of the rectangular projections 40. Therefore, the rectangular projections 40 can be inserted into the rectangular slots 46 in a just-fit manner. The contact between the rectangular projections and slots 40, 42 can be a face-to-face physical contact. Therefore, when the base plate 44 is driven by the AF actuator 14 to move upward or downward, such motion will be immediately transferred to the lens holder 18 honestly and promptly through the fact-to-face physical contact. There will be no delay or backlash-type motion lost. On the other hand, when the lens holder 18 is driven by the IS actuator 10 to move along the X and/or the Y directions, the rectangular projections 40 can slide inside the rectangular slots 46. In some embodiments, grease or lubricant may be applied to the contact surfaces of the mating parts to reduce the friction. It is understood that the connection between the lens holder 18 and the AF connecting member 16 may have many various forms.

FIGS. 5(*a*) and 5(*b*) show two embodiments of the connection mechanism 161, 162 between the lens holder 18 and the AF connecting member 16. As illustrated in FIG. 5(*a*), the AF connection mechanism 161 may include two parallel and spaced part plates 50, 52 and two aligned circular openings 60, 62 formed respectively thereon and defining therebetween an annular slot 58. The annular slot 58 can be configured to receive therein an annular projection 56 formed around the outer surface of the lens holder 18. The diameter of the two circular openings 60, 62 may be slightly larger than the outer diameter of the lens holder 18, thereby allowing sliding movement of the annular projection 56 of the lens holder 18 within the annular slot 58 in a plane perpendicular to the optical axis Z. The space between the parallel plates 50, 52 can be controlled to be substantially close to the thickness of the annular projection 56 on the lens holder 18. The bottom plate 52 can be connected to the AF actuator 14.

In FIG. 5(*b*), the AF connection mechanism 162 may include a base plate 51 having a circular opening 63 and a plurality of headed screws 53 being formed with threaded shank portions 65 inserted through a plurality of openings 57 formed on an annular plate 66 provided on the outer surface of the lens holder 18, and threaded into a plurality of threaded bores 64 formed on the base plate 51 such that the annular plate 66 is disposed between disc-shaped heads 55 of the headed screws 53 and the base plate 51. The diameter of the circular opening 63 may be slightly larger than the outer diameter of the lens holder 18, and the diameter of the plurality of openings 57 on the annular plate 66 may be slightly larger than the diameter of the threaded shank portions 65 of the headed screws 53, thereby allowing sliding movement of the annular plate 66 on the base plate 51 in a plane perpendicular to the optical axis Z. Obviously, there are many other embodiments, which cannot be fully listed in this patent application. However, the basic idea of the AF connection mechanism 16 is that it provides a rigid or solid support or contact between the lens holder 18 and the parts of the AF connection mechanism 16 along the optical axis Z. Such support or contact can rigidly transfer any motion along the optical axis Z from the AF connection mechanism 16 to the lens holder 18 and vice versa. On the other hand, the lens holder 18 is free to move or slide or shift in the AF connection mechanism 16 along the X and/or the Y directions. Any mechanical component, or component assembly, which can provide the aforementioned features or functions shall be considered as an AF connection mechanism as defined herein. In some embodiments, the AF connection mechanism 16 can be integrated into the AF actuator 14 as the output portion of the linear motion.

FIG. 6 shows some embodiments of the integrated AF actuator 14 of the present application. FIG. 6(*a*) shows an integration of the AF actuator 14 with the AF connection mechanism 16 of FIG. 4. FIG. 6(*b*) shows an integration of the AF actuator 14 with the AF connection mechanism 161 of FIG. 5(*a*). FIG. 6(*c*) shows an integration of another AF actuator with the AF connection mechanism 162 of FIG. 5(*b*). Obviously, there are many other embodiments, which cannot be fully listed in this patent application. Any electromagnetic actuator, which can provide the aforementioned features or functions shall be considered as the integrated AF actuator 14 described herein.

Figure 7A:
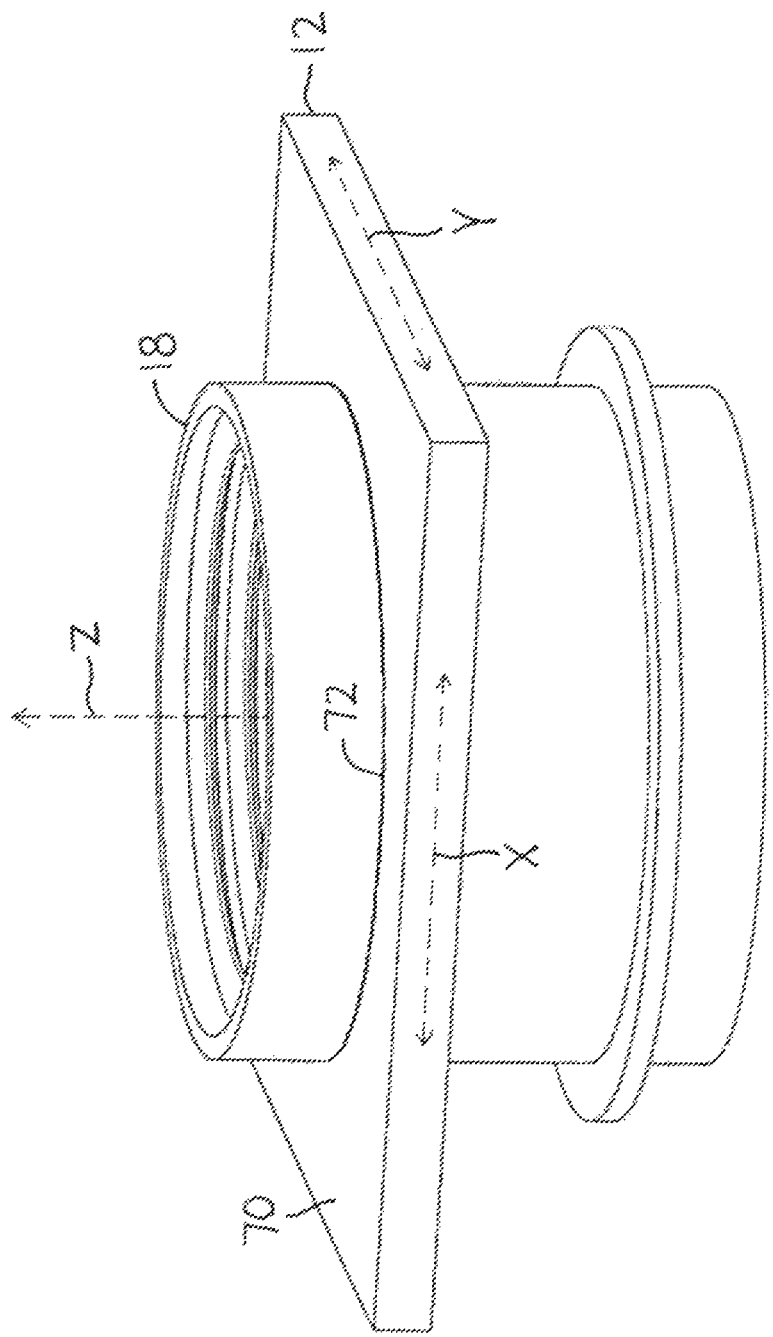
FIG. 7(a) is a perspective view of an image stabilization actuator connected to a lens holder according to an embodiment of the present application.

FIGS. 7(*a*) and 7(*b*) are two embodiments of the connection mechanism of the IS actuator 10 and the lens holder 18. Such IS connection mechanism as shown in FIG. 7(*a*) can be simply a mating of a tubular hole and a tube. In FIG. 7(*a*), the IS actuator 10 can be simplified as an IS motion output port 12. This output port can be represented by a plate 70 with a tubular hole 72 at the center of the plate 70. The cylindrical axis of the tubular hole 72 can be perpendicular to the plate 70 and parallel to the optical axis Z. The diameter of the hole 72 may be substantially close to the outer diameter of the lens holder 18, which is inserted into this hole 72. The inner side wall of the tubular hole 72 and the outer side wall of the lens holder 18 contact each other via a solid face-to-face physical contact. As a result, any tiny motion or movement of the IS motion output port 12 can be immediately transferred to the lens holder 18, and forces the lens holder 18 to move simultaneously and vice versa. On the other hand, the outer side wall of the lens holder 18 is not fixed on the inner side wall of the tubular hole 72. Therefore, the lens holder 18 can move or slide up and down under the AF actuator's actuation transferred via the AF connecting member 16.

In the illustrated embodiment in FIG. 7(b), the IS motion output port can be in the form of a tube 71. The inner diameter of the tube 71 may be substantially close to the outer diameter of the lens holder 18. The lens holder 18 can be inserted into this tube 71. There is no fixing mechanism or material applied to the lens holder 18 and the tube 71. Therefore, the lens holder 18 is able to slide or move inside the tube 71 along the optical axis Z. In some embodiments, grease or lubricant is applied to the contact surface of the lens holder 18 and the tube 71 to reduce the friction.

Advantages of the present actuator is that both the AF actuator 14 and the IS actuator 10 are directly actuating the lens holder 18 only. Although such actuation is done through the AF connection mechanism 16 and the IS connection mechanism 12, it is believed that the resultant power consumption is much lower than BSM and BTM devices due to the light weight of the lens holder 18. Since the IS motion is applied to the lens holder 18 only, the space needed for the IS motion is much smaller than the BSM and BTM devices. It is possible to make an OIS actuator with a substantially similar size as an AF actuator 14 according to an embodiment of the present application.

The compact electromagnetic actuator of the present application can be incorporated into any image-capturing electronic devices such as cameras, video recorders, and mobile phones, etc.

While there has been illustrated and described what are presently considered to be example embodiments, it will be understood by those skilled in the art that various other modifications may be made, and equivalents may be substituted, without departing from the central concept described herein. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A compact electromagnetic actuator for driving a lens, the actuator comprising:
   (a) a lens holder used to hold a lens or a lens assembly which defines an optical axis;
   (b) an image stabilization (IS) actuator provided at one end of the lens holder for producing a linear motion in a plane perpendicular to the optical axis;
   (c) an autofocus (AF) actuator provided at an opposite end of the lens holder for producing a linear motion along the optical axis;
   (d) an AF connection mechanism used to connect the autofocus actuator to the lens holder, wherein the lens holder is engaged and movable with the AF connection mechanism along the optical axis while movable, shiftable, or slidable along a plane perpendicular to the optical axis; and
   (e) an IS connection mechanism used to connect the image stabilization actuator to the lens holder, wherein the lens holder is engaged and movable with the IS connection mechanism in a plane perpendicular to the optical axis while movable, shiftable, or slidable along the optical axis;
   (f) wherein the IS connection mechanism is a motion output port in the form of a single plate having a single circular hollow portion at a center thereof, and the single circular hollow portion has a surface being in direct contact with an outer surface of the lens holder, and slidably abutting against and around the outer surface of the lens holder in the plane perpendicular to the optical axis, thereby transferring the motion of the image stabilization actuator to the lens holder, and allowing sliding movement of the lens holder along the optical axis.

2. The actuator as claimed in claim 1, further comprising a plurality of coil-magnet actuators mounted inside the image stabilization actuator and the autofocus actuator.

3. A compact electromagnetic actuator for driving a lens, the actuator comprising:
   (a) a lens holder used to hold a lens or a lens assembly which defines an optical axis;
   (b) an image stabilization (IS) actuator provided at one end of the lens holder for producing a linear motion in a plane perpendicular to the optical axis; and
   (c) an autofocus (AF) actuator provided at an opposite end of the lens holder for producing a linear motion along the optical axis;
   (d) wherein the image stabilization actuator is connected to the lens holder via an IS connection mechanism, wherein the lens holder is engaged and movable with the IS connection mechanism in a plane perpendicular to the optical axis while movable, shiftable, or slidable along the optical axis; and
   (e) wherein the IS connection mechanism is a motion output port in the form of a single plate having a single circular hollow portion at a center thereof, and the single circular hollow portion has a surface being in direct contact with an outer surface of the lens holder, and slidably abutting against and around the outer surface of the lens holder in the plane perpendicular to the optical axis, thereby transferring the motion of the image stabilization actuator to the lens holder, and allowing sliding movement of the lens holder along the optical axis.

4. The actuator as claimed in claim 3, wherein the motion output port is a bar-type motion output port, and the single circular hollow portion is formed with circumferentially spaced apart and radially inwardly extending bars with surfaces slidably abutting against and around the outer surface of the lens holder.

5. The actuator as claimed in claim 3, wherein the motion output port is a tubular motion output port in the form of a tube having an inner surface for slidably abutting against and around the outer surface of the lens holder.

6. The actuator as claimed in claim 3, further comprising an AF connection mechanism used to connect the autofocus actuator to said lens holder, wherein the lens holder is engaged and movable with the AF connection mechanism along the optical axis while movable, shiftable, or slidable along a plane perpendicular to the optical axis.

7. The actuator as claimed in claim 6, wherein the AF connection mechanism is provided on one side thereof a mating portion formed with two opposite surfaces slidably abutting against two corresponding opposite surfaces formed on another mating portion provided on the lens holder, thereby transferring the linear motion of the autofocus actuator to the lens holder along the optical axis, and allowing sliding movement of the lens holder on the opposite surfaces of the mating portion of the AF connection mechanism in a plane perpendicular to the optical axis.

8. The actuator as claimed in claim 7, wherein the AF connection mechanism comprises a base plate having a circular opening and a plurality of rectangular slots defined by a plurality of L-shaped projections formed on the base plate around the circular opening, the plurality of rectangular slots are configured to receive therein respectively a plurality of rectangular projections formed around the outer surface of the lens holder, wherein the diameter of the circular opening is slightly larger than the outer diameter of the lens holder, thereby allowing sliding movement of the rectangular projections within the rectangular slots in a plane perpendicular to the optical axis.

9. The actuator as claimed in claim 6, wherein the AF connection mechanism comprises two parallel and spaced part plates and two aligned circular openings formed respectively thereon and defining therebetween an annular slot configured to receive therein an annular projection formed around the outer surface of the lens holder, wherein the diameter of the two circular openings is slightly larger than the outer diameter of the lens holder, thereby allowing sliding movement of the annular projection of the lens holder within the annular slot in a plane perpendicular to the optical axis.

10. The actuator as claimed in claim 6, wherein the AF connection mechanism comprises a base plate having a circular opening and a plurality of headed screws being formed with threaded shank portions inserted through a plurality of openings formed on an annular plate provided on the outer surface of the lens holder, and threaded into a plurality of threaded bores formed on the base plate such that the annular plate is disposed between heads of the headed screws and the base plate, wherein the diameter of the circular opening is slightly larger than the outer diameter of the lens holder, and the diameter of the plurality of openings on the annular plate is slightly larger than the diameter of the threaded shank portions of the headed screws, thereby allowing sliding movement of the annular plate on the base plate in a plane perpendicular to the optical axis.

11. The actuator as claimed in claim 3, wherein the autofocus actuator comprises an autofocus motion output port for outputting the linear motion of the autofocus actuator to the lens holder.

12. The actuator as claimed in claim 11, wherein the autofocus motion output port is a rod-type motion output port.

13. The actuator as claimed in claim 11, wherein the autofocus motion output port is a cylindrical motion output port.

14. The actuator as claimed in claim 11, wherein the autofocus motion output port is a planar motion output port.

15. The actuator as claimed in claim 11, wherein the autofocus motion output port is an octagonal motion output port.

16. The actuator as claimed in claim 3, further comprising a plurality of coil-magnet actuators mounted inside the image stabilization actuator and the autofocus actuator.

17. The actuator as claimed in claim 16, wherein a spring is provided to replace one of the coil-magnet actuators.

* * * * *